Patented Nov. 13, 1945

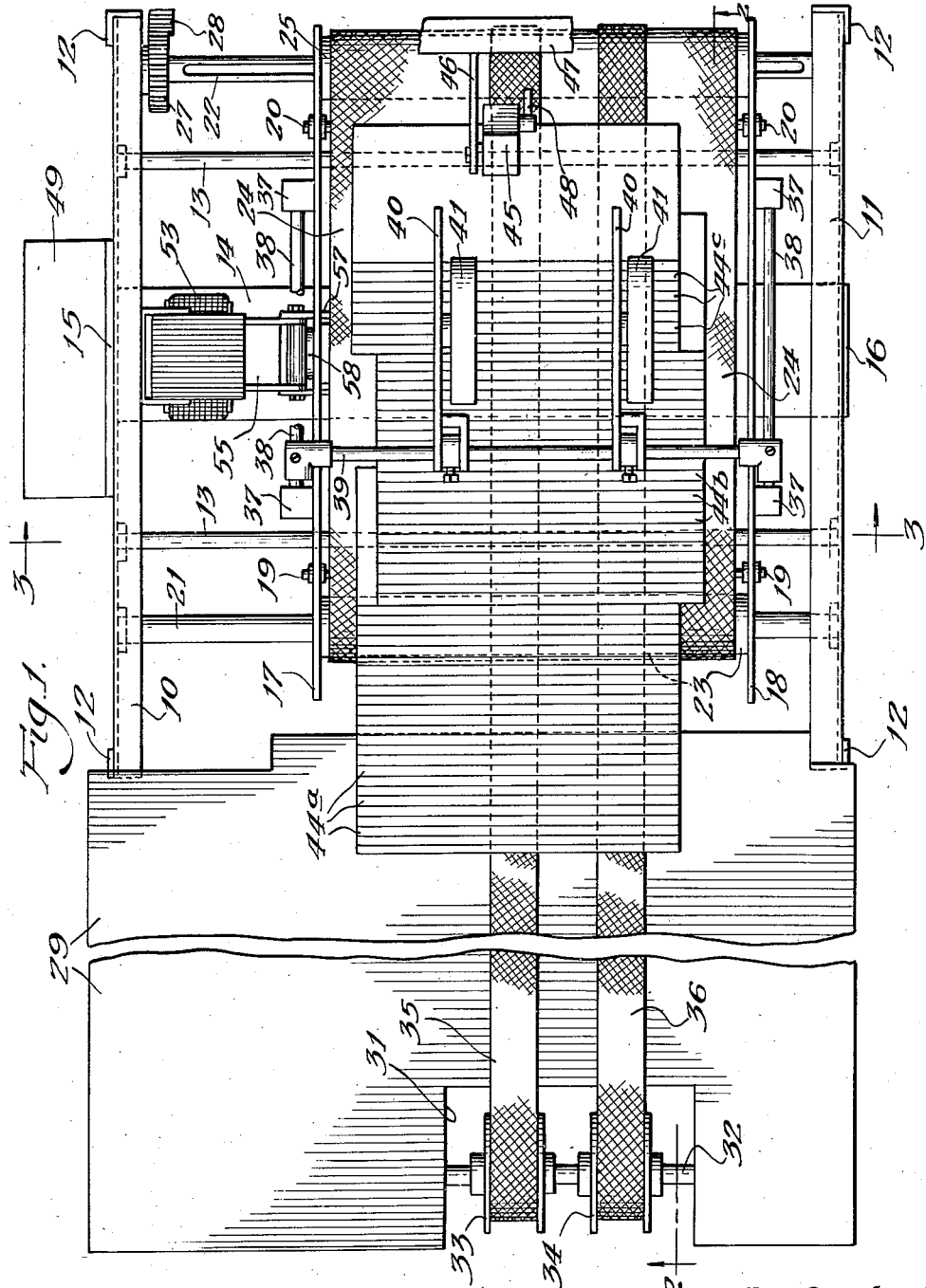

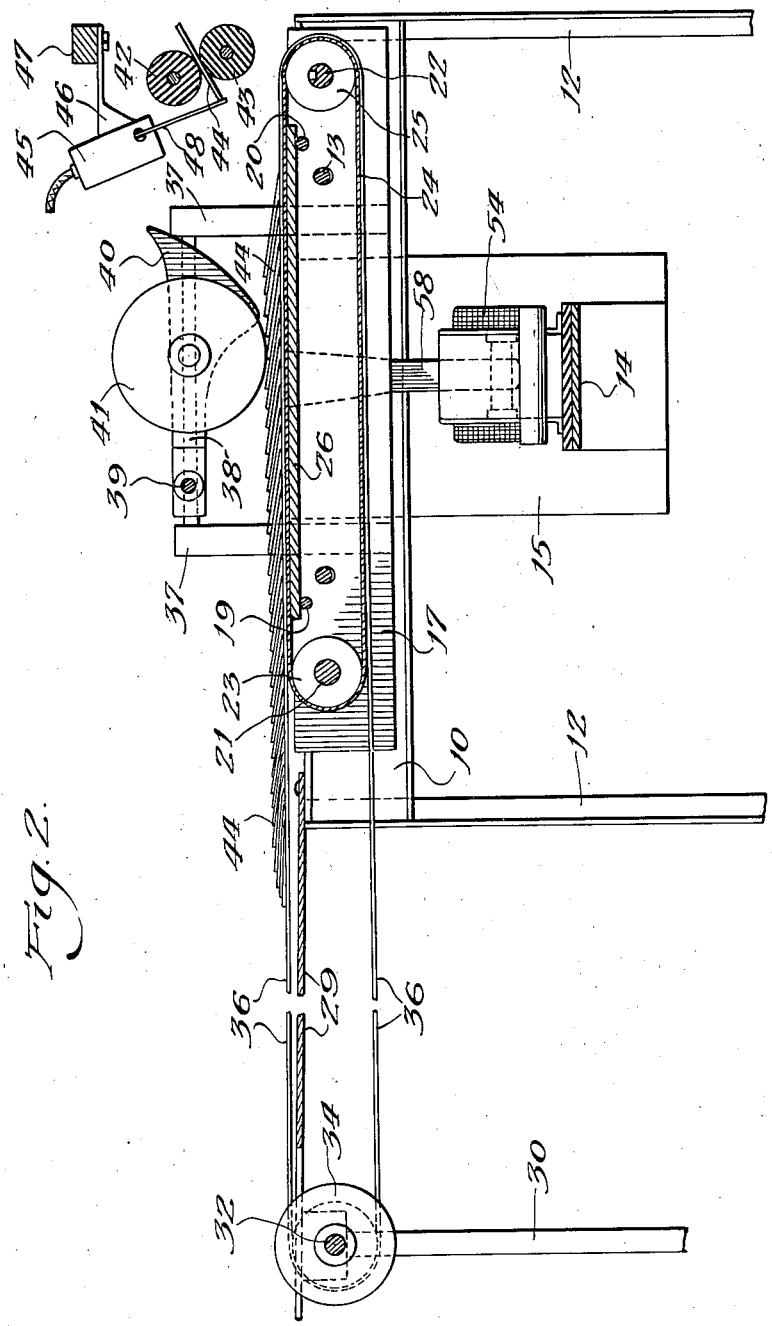

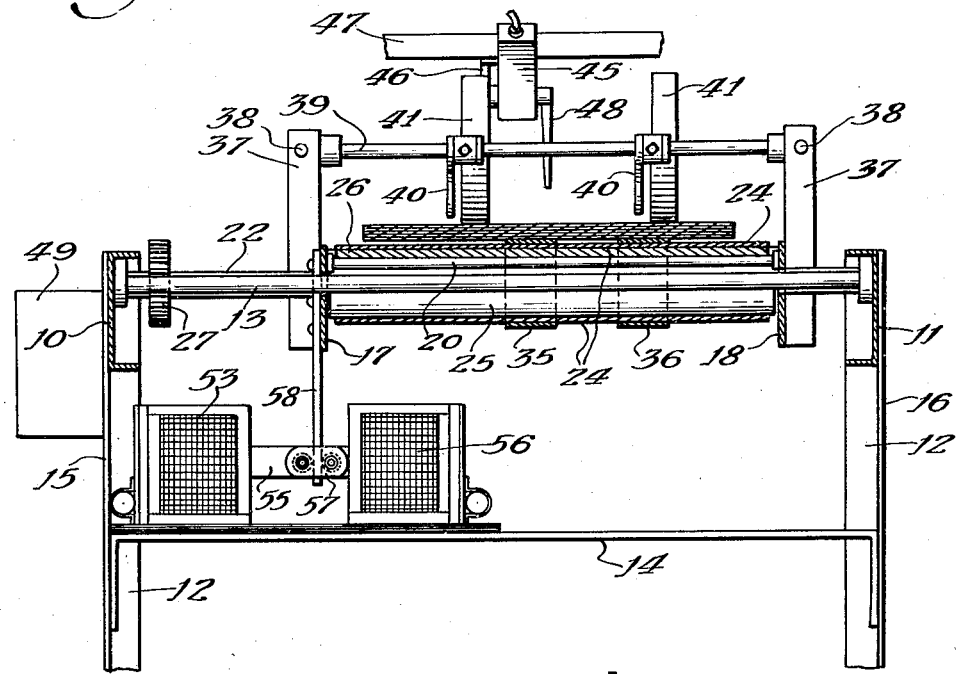
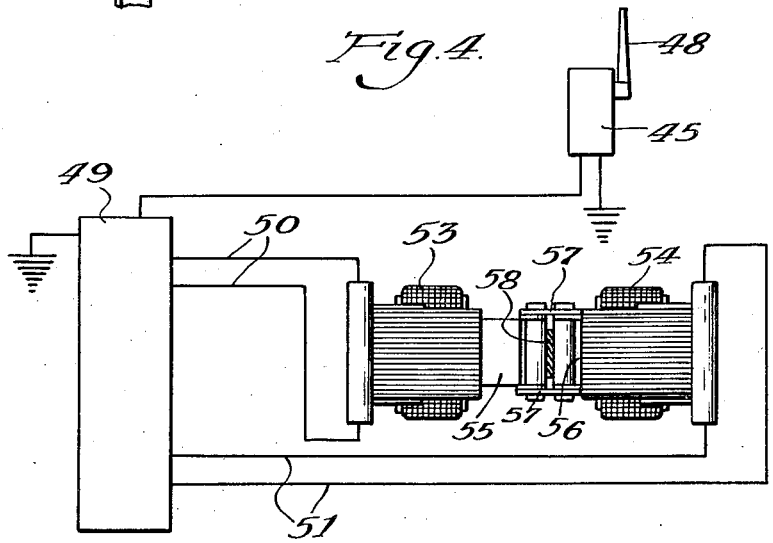

2,389,107

UNITED STATES PATENT OFFICE 2,389,107

COUNTING DEVICE

Ernest Granville Rice, Chicago, Ill., assignor to Redson-Rice, Chicago, Ill., a copartnership Application November 3, 1944, Serial No. 561,807

17 Claims. (Cl. 93—93)

This invention relates to devices for counting sheets, envelopes, cards or other parts adapted to be moved forwardly by a belt or other conveyor in spaced or overlapping arrangement with respect to each other along the conveyor, and it has for its object the provision of a new and improved form and arrangement of parts of this type by which the row of envelopes or other articles on the belt may be offset sidewise at selected points in successively opposite directions for indicating the division of the envelopes into bunches of predetermined size.

For accomplishing this result, I have provided a conveyor comprising a wide endless belt driven continuously at constant speed and receiving thereon one at a time at intervals the envelopes or other parts to be counted, the forward movement of the belt serving to cause the envelopes or other parts to be arranged in spaced or overlapping relationship with respect to each other longitudinally of the belt. In the preferred arrangement, means is provided for shifting the belt sidewise in successively opposite directions at predetermined intervals for causing the envelopes or other articles to be deposited differentially on the belt with the division points between successive bunches clearly indicated. In this arrangement, each bunch of articles is offset laterally with respect to both the bunch ahead and the bunch following.

For carrying the envelopes or other articles being counted forwardly beyond the forward end of the wide belt, I have provided a pair of narrow endless belts which extend at their rear ends about the wide belt so as to be supported thereby and extend forwardly a substantial distance beyond the forward end of the wide belt. In this arrangement, no means is provided for shifting the forward ends of the narrow belts laterally, while the rear end portions of said narrow belts are shifted laterally by their engagement with the wide belt about which they extend. The construction is such that the wide belt and the spaced narrow belts acting cooperatively support the articles in the two-fold alignment arrangement in which they are placed on the belts without any substantial disarrangement as the articles move forwardly, and that the articles are still maintained in their bunched condition on the narrow belts after they have passed beyond the forward end of the wide belt.

The preferred means for moving the wide belt laterally comprises a trigger device which is positioned directly at the point where the envelopes or cards are deposited on the wide belt so as to be operated by the envelopes or cards as they move into position on the belt, whereby I am able to obtain an accurate control of the bunching for insuring an accurate count of the envelopes or other articles.

It is another object of my invention to improve devices of this type in sundry details hereinafter pointed out. The preferred means by which I have accomplished my several objects are illustrated in the accompanying drawings, in which Fig. 1 is a top plan view of my improved machine, partly broken away for clearness of illustration;

Fig. 2 is a longitudinal vertical sectional view taken substantially at the line 2—2 of Fig. 1;

Fig. 3 is a transverse vertical sectional view taken substantially at the line 3—3 of Fig. 1; and Fig. 4 is a diagrammatic view showing the connections between the several elements of the electrically operated control means by which the belt is shifted laterally at the desired intervals.

Referring to the several figures of the drawings, in which corresponding parts are indicated by the same reference characters, 10 and 11 indicate frame bars in the form of channels at opposite sides of my machine, supported by legs 12 of angle-iron and rigidly connected together by round crossbars 13 and by a cross-plate 14 secured between plates 15 and 16 extending downwardly from the side bars 10 and 11.

Upon the crossbars 13, I have slidably mounted an auxiliary frame comprising side plates 17 and 18 rigidly connected together by round crossbars 19 and 20. At opposite ends of the side plates 17 and 18, I have journalled shafts 21 and 22 which extend at opposite sides of the machine into engagement also with the side bars 10 and 11 of the supporting framework, the arrangement being such that the auxiliary frame is slidable easily on the cross bars and the shafts. On the shaft 21, I have loosely mounted a roller 23 between the side plates 17 and 18 adapted to support the forward end of a wide endless belt 24, the rear end of the belt being supported by a roller 25 having a keyed sliding mount on the shaft 22 so as to rotate therewith between said side plates 17 and 18. Underneath the top ply of the belt 24 I have provided a tray or table 26 supported at its end portions by the crossbars 19 and 20, the table 26 serving as a support for the top ply so as to keep it even and level when pressure is applied downwardly thereon. The shaft 22 is provided with a gear 27 thereon in position to mesh with a gear 28 rotatably mounted on the adjacent machine by which articles are fed to the belt 24 as hereinafter described. The arrangement is such that the belt 24 is adapted to be driven at even rate continuously with its upper ply travelling forwardly toward the left in Fig. 1.

At the forward end of the machine, I have provided an extension comprising a table 29 supported at its forward corners by legs 30. In a notch 31 in the forward edge of the table, I have mounted a shaft 32 so as to support pulleys 33 and 34 loosely thereon, about which narrow endless belts 35 and 36 extend at their forward ends, with their rear ends wrapped about the rear end of the wide endless belt 24 so as to be driven by engagement therewith. The narrow belts 35 and 36 are of substantial length and are fairly loose so that the rear ends of the belts can be shifted laterally to a slight extent with the wide belt 24 without interfering with the satisfactory operation of the mechanism, this result being obtained without any lateral shifting of the forward ends of the narrow belts.

At opposite sides of the auxiliary frame, I have provided standards 37 for supporting bars 38 longitudinally of the machine, with a crossbar 39 slidably mounted thereon. Upon the crossbar 39, I have mounted arms 40 so as to be adjustable transversely of the machine along the crossbar and so as to be adapted to swing vertically about the crossbar. Upon the arms 40, I have rotatably mounted rollers 41 so as to press downwardly on the belt 24.

In the arrangement shown in Fig. 2, my improved machine is located in position to receive from a suitable delivery means envelopes or cards or other like articles deposited on the belts 35 and 36 and the belt 24 in aligned position longitudinally of the machine for each of a number of successive shifted positions of the belt 24, with the successive articles arranged in overlapping relationship as the top plies of the belts are driven toward the left in Fig. 2. In the arrangement shown, the delivery means comprises two cooperating rollers 42 and 43 between which the envelopes or other articles pass for deposit on the belts. In said Fig. 2, an envelope or card 44 is shown in position between the rollers, and a series of such envelopes or cards 44 are shown in position on the belts. In the arrangement shown in Fig. 1, a series of articles 44a have been deposited in alignment on the belts, after the completion of which operation the belt 24 was shifted toward the side bar 10 for the deposit of the second bunch of articles 44b in alignment with each other but in offset relation to the bunch of articles 44a. The belt 24 was then shifted toward the side bar 11, after which a plurality of the next succeeding bunch of articles 44c were placed on the belt.

In my preferred arrangement, as illustrated, the succeeding bunches of articles are of the same size, the timing for the shifting of the belt being controlled by means comprising suitable counting mechanism. In the embodiment shown, the action is controlled for causing the deposit of twenty-five articles in each bunch before the shifting of the belt in each instance, but it will be understood that any other suitable size of bunch may be had as desired. My improved control mechanism is electrically operated, but any other type of control mechanism may be employed which will insure the arrangement of the articles in equal-numbered bunches.

My control mechanism includes a trigger device 45 carried by a bracket 46 mounted on a stationary frame bar 47. The arrangement is such that the trigger 48 stands normally in the path of the card or envelope 44 in its movement between the gripping rollers 42 and 43 so that the trigger is given a swinging movement downwardly and forwardly by each article in turn as it is deposited on the belts 35 and 36. The trigger device is of the type that causes electrical impulses to be registered in an electrical counter device 49 to which the trigger device is electrically connected, one of such impulses being registered for each article engaging the trigger. The counter device, in the arrangement shown, has two electrical circuits 50 and 51 leading therefrom and arranged so as to be energized alternately, one being de-energized at the same instant when the other is energized.

As is best shown in Fig. 4, the trigger device and the counter device are both grounded to the framework of the machine and are connected by a lead 52. In this arrangement, the circuit 50 is connected with a solenoid 53 and the circuit 51 with a solenoid 54, the armatures 55 and 56 of the two solenoids being in alignment and being connected together by links 57 for causing them to move in unison. As is clearly shown in Fig. 3, the solenoids are positioned so that a wooden arm 58 carried by the side bar 17 of the auxiliary frame extends downwardly between the ends of the connected armatures. The arrangement is such that when the solenoid 54 is energized the connected armatures move toward the right in Figs. 3 and 4 for moving the belt 24 and the rear end portions of the belts 35 and 36 toward the side bar 11 of the supporting framework and that when the solenoid 53 is energized the armatures move toward the left for shifting the belt 24 and the rear end portions of the belts 35 and 36 toward the side bar 10. The arrangement of the counter device is such that the belts remain in each shifted position in turn during the deposit of twenty-five cards or envelopes thereon so as to cause the successive articles to be deposited in accurate alignment with each other along the belts. This insures a clear indication of the division points between successive bunches of the articles.

With the envelopes or other articles coming forwardly rapidly on the belts 35 and 36 with the points of division clearly indicated between the bunches of articles, two operators at opposite sides of the table 29 are enabled to place each bunch of the articles in a separate envelope or other container and to pack the accumulating filled envelopes into a carton ready for shipment. By the use of the short wide endless belt 24 underneath the long narrow belts 35 and 36 at the point where the articles are originally deposited, the arrangement of the articles in aligned relationship in each bunch and with successive bunches offset laterally with respect to each other on the belts is readily accomplished, a clear demarcation between successive bunches being assured. When the articles are carried forwardly by the narrow belts 35 and 36 beyond the forward end of the wide belt, there may be a slightly greater tendency for disarrangement of the articles, but under ordinary conditions there is no difficulty whatever with respect to distinguishing between the successive bunches so as to enable an operator to work rapidly with full assurance that the count is absolutely correct.

The trigger device 45, the counter device 49, and the solenoids 53 and 54 as shown in the drawings are of any approved type and form in and of themselves no part of my present invention, the devices actually employed by me in my machine having been purchased on the market. It is believed to be unnecessary, accordingly, to show the construction of these parts or to describe their operation further than is done above.

While I prefer to employ the form and arrangement of parts as shown by the drawings and as above described, the invention is not to be limited to such form and arrangement except so far as the claims may be so limited, it being understood that changes might well be made in the arrangement without departing from my invention.

I claim:

1. A counting mechanism comprising in combination an endless belt, means for supporting the belt and moving it forwardly, means for depositing a series of articles to be counted on the belt in longitudinal alignment thereon, and means for shifting the belt laterally at predetermined intervals for causing the line of articles on the belt to be offset laterally at spaced points for indicating division points between successive bunches of the articles.

2. A counting mechanism comprising in combination an endless belt, means for supporting the belt and moving it forwardly, means for depositing a series of articles to be counted on the belt in longitudinal alignment thereon with the several articles arranged in incumbent overlapping position, and means for shifting the belt laterally in successively opposite directions at predetermined intervals for causing the line of articles on the belt to be offset laterally at spaced points for indicating division points between successive bunches of the articles.

3. A counting mechanism comprising in combination an endless belt, means for supporting the belt and moving it forwardly, means for depositing a series of articles to be counted on the belt in longitudinal alignment thereon, and means comprising a trigger device engaging the several articles successively at a point closely adjacent to that at which the articles are deposited on the belt for shifting the belt laterally after the deposit of a predetermined number of the articles on the belt for causing the line of articles on the belt to be offset laterally at spaced points for indicating division points between successive equal-sized bunches of the articles.

4. A counting mechanism comprising in combination an endless belt, means for supporting the belt and moving it forwardly, means for depositing a series of articles to be counted on the belt in longitudinal alignment thereon, and means comprising a trigger device engaging the several articles as they are deposited on the belt for shifting the belt laterally in successively opposite directions after the deposit of a predetermined number of articles on the belt for causing the line of articles on the belt to be offset laterally at spaced points for indicating division points between successive equal-sized bunches of the articles.

5. A counting mechanism comprising in combination a supporting frame, an auxiliary frame slidable horizontally on said supporting frame, a conveyor comprising an endless belt movable on said auxiliary frame at a substantial angle from the direction of movement of said auxiliary frame on said supporting frame, means for giving said endless belt continuous movement on said auxiliary frame, means for depositing a series of articles to be counted on said belt in alignment with each other longitudinally of the belt, and means for shifting said auxiliary frame and said belt laterally at predetermined intervals for causing the line of articles on the belt to be offset laterally at spaced points for indicating division points between successive bunches of the articles.

6. A counting mechanism comprising in combination a supporting frame, a shaft rotatably mounted in horizontal position on said frame, an auxiliary frame slidably mounted on said shaft, an endless belt movably supported by said shaft and other cooperating supporting means carried by said auxiliary frame so as to be driven by the shaft but so as to be movable laterally thereon, means for rotating said shaft so as to drive said belt continuously, means for depositing a series of articles to be counted on said belt in alignment with each other longitudinally of the belt, and means for shifting said auxiliary frame and said belt laterally at predetermined intervals for causing the line of articles on the belt to be offset laterally at spaced points for indicating division points between successive bunches of the articles.

7. A counting mechanism comprising in combination two long endless belts, means for supporting said belts in laterally spaced relation to each other and for moving them forwardly together, means for depositing a series of articles to be counted on the belts in longitudinally aligned position with each other on the belts, and means for shifting the rear end portions of the belts laterally at predetermined intervals for causing the line of articles on the belts to be offset laterally at spaced points for indicating division points between successive bunches of the articles.

8. A counting mechanism comprising in combination two long endless belts, means for supporting said belts in laterally spaced relation to each other and for moving them forwardly together, means for depositing a series of articles to be counted on the belts in longitudinally aligned position with each other on the belts, and means for swinging the rear end portions of the belts laterally with respect to their forward end portions at predetermined intervals for causing the line of articles on the belts to be offset laterally at spaced points for indicating division points between successive bunches of the articles.

9. A counting mechanism comprising in combination two long endless belts, means for supporting said belts in laterally spaced relation to each other and for moving them forwardly together, means for depositing a series of articles to be counted on the belts in longitudinally aligned position with each other on the belts, means underneath the top plies of said belts in position to assist in holding the articles in their arranged positions on the belts as the articles are carried along by the belts, and means for shifting the rear end portions of the belts laterally at predetermined intervals for causing the line of articles on the belts to be offset laterally at spaced points for indicating division points between successive bunches of the articles.

10. A counting mechanism comprising in combination two long endless belts, means for supporting said belts in laterally spaced relation to each other and for moving them forwardly together, means for depositing a series of articles to be counted on the belts in longitudinally aligned position with each other on the belts, fixedly-mounted table means underneath the top plies of said two belts in position to assist in supporting the articles deposited on the belts, and means for shifting the rear end portions of the belts laterally at predetermined intervals for causing the line of articles on the belts to be offset laterally at spaced points for indicating division points between successive bunches of the articles.

11. A counting mechanism comprising in combination a comparatively wide endless belt, means for supporting the belt and moving it forwardly, two long endless belts supported at their rear end portions by engagement about said first named belt in laterally spaced relation to each other, means for movably supporting the forward end portions of said two belts, means for depositing a series of articles to be counted on said laterally spaced belts in position to be supported in part by said first named belt and in aligned position with respect to each other longitudinally of the belts, and means for shifting said first named belt and the rear end portions of said two belts laterally at predetermined intervals for causing the line of articles on the belts to be offset laterally at spaced points for indicating division points between successive bunches of the articles.

12. A counting mechanism comprising in combination a supporting frame, a shaft rotatably mounted in horizontal position on said frame, an auxiliary frame slidably mounted on said shaft, an endless belt movably supported by said shaft and other cooperating supporting means carried by said auxiliary frame so as to be driven by the shaft but so as to be movable laterally thereon, means for rotating said shaft so as to drive said belt continuously, two endless belts supported at their rear end portions by engagement about said first-named belt in laterally spaced relation to each other, means for movably supporting the forward end portions of said two belts, means for depositing a series of articles to be counted on said laterally spaced belts in position to be supported in part by said first-named belt and in aligned position with respect to each other longitudinally of the belts, and means for shifting said auxiliary frame and said first-named belt laterally at predetermined intervals for causing the line of articles on the belts to be offset laterally at spaced points for indicating division points between successive bunches of the articles.

13. A counting mechanism comprising in combination an endless belt, means for supporting the belt and moving it forwardly, means for depositing a series of articles to be counted on the belt in longitudinal alignment thereon, a trigger actuated by engagement with the several articles successively as they are deposited on said belt, and means comprising a solenoid adapted by energization after each predetermined number of swinging movements of the trigger to move the belt sidewise so as to break the continuity of the established line of articles on the belt for indicating division points between successive equal-numbered bunches of the articles.

14. A counting mechanism comprising in combination an endless belt, means for supporting the belt and moving it forwardly, means comprising a pair of cooperating driven rollers for depositing a series of articles to be counted on the belt in longitudinal alignment thereon, a trigger actuated by engagement with the several articles successively while they are moving in the grip of said rollers before deposit on the belt, and means comprising a solenoid adapted by energization after each predetermined number of swinging movements of the trigger to give said belt a lateral movement for causing the line of articles on the belt to be offset laterally at spaced points for indicating division points between successive equal-sized bunches of the articles.

15. A counting mechanism comprising in combination an endless belt, means for supporting the belt and moving it forwardly, means comprising a pair of cooperating driven rollers for depositing a series of articles to be counted on the belt in longitudinal alignment thereon, a trigger actuated by engagement with the several articles successively while they are moving in the grip of said rollers before deposit on the belt, means comprising a solenoid adapted by energization after a predetermined number of swinging movements of the trigger to give said belt a lateral movement in one direction, and means comprising a second solenoid adapted by energization after the next series of the same number of swinging movements of the trigger to give the belt a lateral movement in the opposite direction, said lateral movements of the belt serving to cause the line of articles on the belt to be offset laterally at spaced points therealong for indicating division points between successive equal-sized bunches of the articles.

16. A counting mechanism comprising in combination an endless belt, means for supporting the belt and moving it forwardly, means comprising a pair of cooperating driven rollers for depositing a series of articles to be counted on the belt in longitudinal alignment thereon, a trigger actuated by engagement with the several articles successively while they are moving in the grip of said rollers before deposit on the belt, two solenoids in spaced relation to each other with their armatures connected so as to be moved in one direction by one of the solenoids and moved in the opposite direction by the other of the solenoids, and an arm connected with said endless belt for moving the belt laterally and engaging said connected armatures adapted by the energization of one of said solenoids after a predetermined number of swinging movements of the trigger to move the belt laterally in one direction and adapted by energization of the other of said solenoids after the next series of the same number of swinging movements of the trigger to move the belt laterally in the opposite direction, said lateral movements of the belt serving to cause the line of articles on the belt to be offset laterally at spaced points therealong for indicating division points between successive equal-sized bunches of the articles.

17. A counting mechanism comprising in combination a supporting frame, a shaft rotatably mounted in horizontal position on said frame, an auxiliary frame slidably mounted on said shaft, an endless belt movably supported by said shaft and other cooperating supporting means carried by said auxiliary frame so as to be driven by the shaft but so as to be movable laterally thereon, means for rotating said shaft so as to drive said belt continuously, means comprising a pair of cooperating driven rollers for depositing a series of articles to be counted on the belt in longitudinal alignment thereon, a trigger actuated by engagement with the several articles successively while they are moving in the grip of said rollers before deposit on the belt, two solenoids in spaced relation to each other with their armatures connected so as to be moved in one direction by one of the solenoids and moved in the opposite direction by the other of the solenoids, and a resilient wooden arm connected rigidly with said auxiliary frame for moving the auxiliary frame and said belt laterally and engaging said connected armatures adapted by the energization of one of said solenoids after a predetermined number of swinging movements of the trigger to move the belt laterally in one direction and adapted by energization of the other of said solenoids after the next series of the same number of swinging movements of the trigger to move the belt laterally in the opposite direction, said lateral movements of the belt serving to cause the line of articles on the belt to be offset laterally at spaced points therealong for indicating division points between successive equal-sized bunches of the articles.

ERNEST GRANVILLE RICE.